United States Patent [19]

Graftieaux et al.

[11] 4,380,527

[45] Apr. 19, 1983

[54] STANDARD FISSION PRODUCT EMISSION DEVICE FOR DETECTING FAILED FUEL ELEMENTS IN A NUCLEAR REACTOR

[75] Inventors: Jean Graftieaux, Chatenay Malabry; René Donguy, Verrieres le Buisson, both of France

[73] Assignee: Commissariat a l'Energie Atomique, Paris, France

[21] Appl. No.: 178,291

[22] Filed: Aug. 15, 1980

[30] Foreign Application Priority Data

Aug. 28, 1979 [FR] France ................. 79 21543

[51] Int. Cl.$^3$ ............................................. G21C 17/00
[52] U.S. Cl. ..................................... 376/245; 376/253; 376/450
[58] Field of Search ................. 376/253, 251, 450, 245

[56] References Cited

U.S. PATENT DOCUMENTS

| | | | |
|---|---|---|---|
| 2,987,459 | 6/1961 | LaBeyrie et al. | 376/253 |
| 3,234,101 | 2/1966 | Berthod | 376/253 |
| 3,357,891 | 12/1967 | Wadmark | 376/253 |
| 3,856,620 | 12/1974 | Tomabechi | 376/253 |
| 3,941,652 | 3/1976 | Delisle et al. | 376/253 |
| 4,032,395 | 6/1977 | Burnette | 376/253 |

FOREIGN PATENT DOCUMENTS 2537393 3/1977 Fed. Rep. of Germany ...... 376/253
2702003 7/1977 Fed. Rep. of Germany ...... 376/253

Primary Examiner—Sal Cangialosi
Attorney, Agent, or Firm—Pearne, Gordon, Sessions, McCoy, Granger & Tilberry

[57] ABSTRACT

The present invention relates to a standard fission product emission device, for detecting failed fuel elements in a nuclear reactor of the type cooled by pressurized water, said reactor comprising a pressure-resistant vessel and a core constituted by fuel element assemblies, wherein said device comprises a hollow rod, adapted to be inserted into said vessel and defining a chamber divided into a first chamber and a second chamber located at the end of the rod by a constriction creating a first drop in pressure, said second chamber comprising on its wall a deposit or a metal plate of radioactive material and communicating with the vessel of the reactor, when said device is in position, by a nozzle creating a second drop in pressure greater than the one created by said constriction, a first tube disposed in said rod and opening out at the end of the first chamber remote from the second chamber, said first tube being adapted to be connected to a source of pressurized water at a pressure greater than that of the cooling water of said reactor, and a second tube also opening out at the end of the first chamber remote from the second chamber and adapted to collect the fission products emitted by said deposit when no pressure is applied at the inlet of said tube.

3 Claims, 4 Drawing Figures

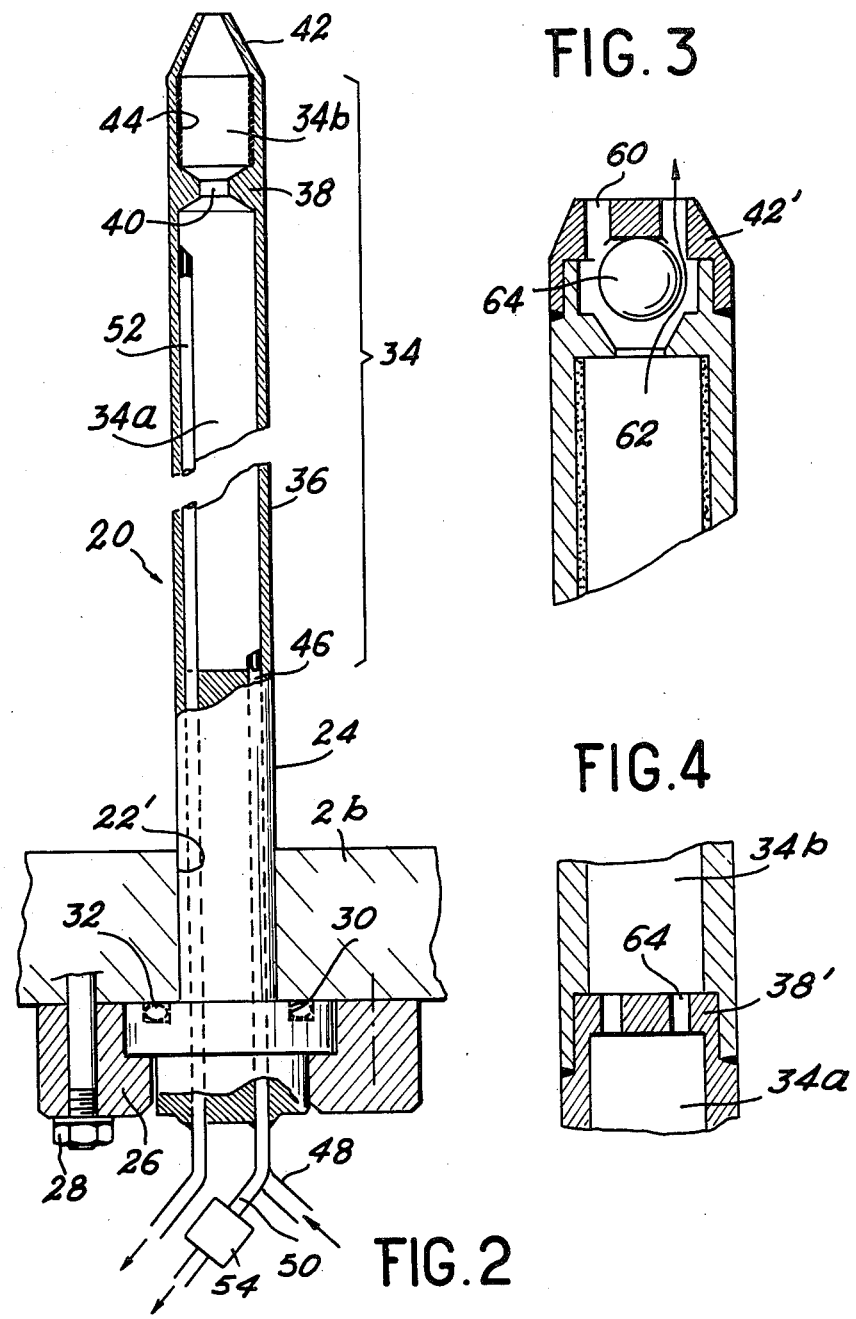

STANDARD FISSION PRODUCT EMISSION DEVICE FOR DETECTING FAILED FUEL ELEMENTS IN A NUCLEAR REACTOR

The present invention relates to a standard fission product emission device for detecting failed fuel elements in a nuclear reactor of the pressurised water type.

More precisely, the present invention relates to a device inserted in the vessel of a nuclear reactor of the pressurised water type, which allows the controlled emission of fission products, this emission of fission products serving to standardise the devices for detecting the failed fuel elements of the nuclear reactor, these detection devices being mounted in the primary circuit of the nuclear reactor.

In order better to understand the problem to be solved, reference will advantageously be made to accompanying FIG. 1 which schematically shows a nuclear reactor of the pressurised water type with a primary cooling loop. This Figure shows the vessel of the reactor 2 containing the core 4 thereof which is constituted, in known manner, by fuel assemblies 6. The primry loop of the reactor also comprises a heat exchanger or steam generator 8 and a circulating pump 10 which are connected via primary conduits 12 and 14 to the vessel of the reactor. This is, of course, a simplified figure and, in fact, the reactor is known to comprise a plurality of cooling loops. The failed fuel element detection device 16 is preferably disposed on conduit 12 which connects the outlet of the vessel of the reactor 2 to the inlet of the steam generator 8. This failed fuel element detection device allows such a detection by measuring the rate of fission products in the cooling liquid. Moreover it will be readily understood that the detection of the failed claddings which surround the fuel elements constituting the core is a very important problem of security, since these claddings surrounding the fuel material constitute the first protective coating against the fission products.

Moreover, it will be understood that, to ensure that the detectors function correctly, it is necessary to test them, i.e. necessary to be able to detect, with the aid of device 16, the presence of a standard quantity of fission products contained in the cooling water. This is the object of the present invention.

In prior art techniques, such a standardisation was obtained by placing in the vessel 2 of the reactor in the stream of the coolant fluid at a chosen spot, a radioactive body such as metal uranium or a deposit of uranium oxide.

However, this technique did not give good results for the following reasons:

There was a permanent emission of fission products in the primary cooling circuit, which had the drawback of increasing pollution and of creating a background noise altering the real measurements made by the failed fuel element detection device outside the periods of standardisation No control was possible as to the evolution of the level of activity of the standard source and consequently, after a certain operating time, the standardisation of the failed fuel element detection device risked becoming illusory.

In the case of deterioration of the source, radioactive fragments could be introduced into the primary cooling circuit.

It is precisely an object of the present invention to provide a standard fission product emission device for detecting failed fuel elements in a nuclear reactor of the pressurised water type, which overcomes the drawbacks mentioned hereinabove. In particular, the device according to the invention avoids a continuous passage in the coolant liquid of fission products; it makes it possible to define very precisely the periods of emission of these fission products, said periods corresponding to the instants of standardisation; and finally, it avoids the passage in the coolant liquid of fragments of the radioactive material used as fission product standard.

To obtain these results, the standard fission product emission device for the detection of failed fuel elements in a nuclear reactor of the type cooled by pressurised water, said reactor comprising a pressure-resistant vessel and a core constituted by fuel element assemblies, is characterised in that it comprises a hollow rod adapted to be inserted into said vessel and defining a chamber divided into a first chamber and a second chamber located at the end of the rod by a constriction creating a first drop in pressure, said second chamber comprising on its wall a deposit or metal plate of radioactive material and communicating with the vessel of the reactor, when said device is in position, by a nozzle creating a second drop in pressure greater than that which is created by said constriction, a first tube disposed in said rod and opening out at the end of the first chamber remote from the second chamber, said first tube being adapted to be connected to a source of pressurised water at a pressure greater than that of the cooling water of said reactor, and a second tube also opening out at the end of the first chamber remote from the second chamber and adapted to collect the fission products emitted by said deposit when no pressure is applied at the inlet of said tube.

According to an improved embodiment, the device comprises a third tube disposed in said rod and opening out at the end of said first chamber close to the second chamber, said third tube being adapted to collect the water injected at a low rate of flow into said first tube under the effect of the drop in pressure created by said constriction.

Due to this improved embodiment, the first chamber may be scavenged before provoking the controlled emission of fission products. This therefore makes it possible to obtain a square-wave emission of fission products with a well determined rising leading edge. Now, it has proved that accidents corresponding to failed fuel elements are in such form.

The chamber is preferably sufficiently long and has walls made of a sufficiently good heat-conducting material for the water injected into said chamber and leaving through said nozzle to be at a temperature substantially equal to that of the water in the vessel of the reactor.

It will be understood that, due to this latter arrangement, the thermal shock which would result from the direct injection of water at relatively low temperature into the water of the vessel which has a temperature of the order of 320° C., is avoided.

The invention will be more readily understood on reading the following description with reference to the accompanying drawings, in which FIG. 1 is a simplified view of a nuclear reactor of the PWR type, showing the installation of the standard fission product emission devices according to the invention.

FIG. 2 is a view showing in vertical section the whole of the device according to a first embodiment.

FIG. 3 is a partial view of FIG. 2, showing a variant embodiment of the outlet nozzle of the chamber of the device.

FIG. 4 is a partial view in vertical section showing a variant embodiment of the constriction separating the first chamber from the second chamber.

Figure 1:
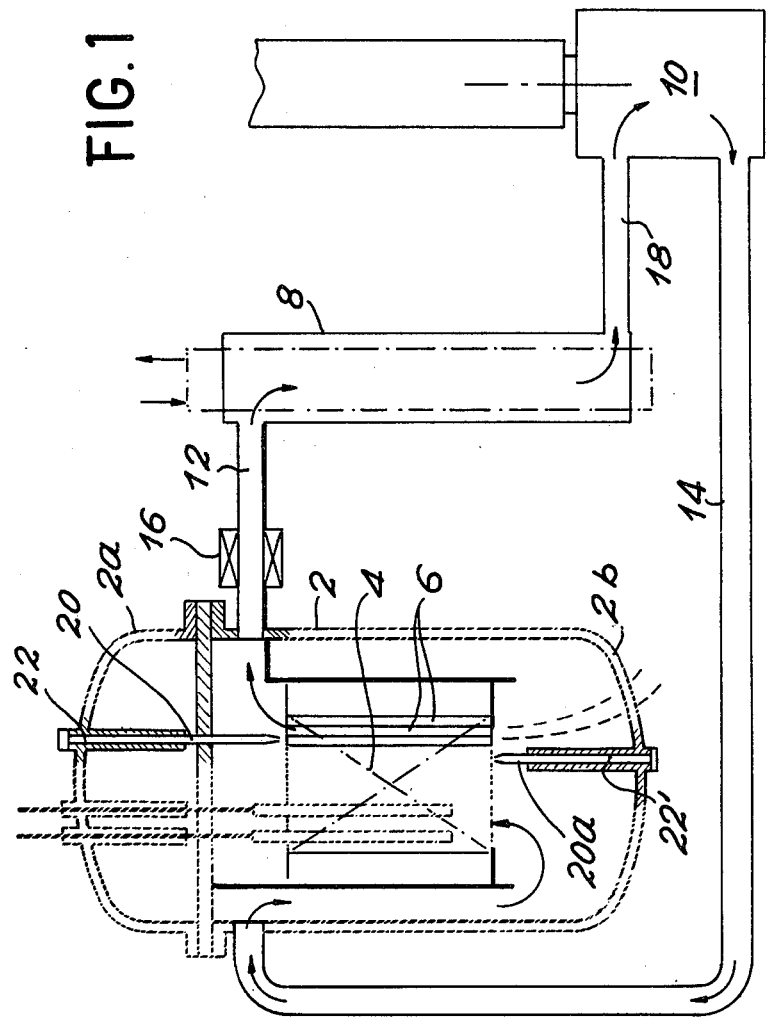

Referring now to the drawings, FIG. 1 shows two fission product emission devices according to the invention, positioned in the vessel of the reactor. These devices are referenced 20a and 20b respectively. They are positioned inside the vessel through apertures 22 and 22', so-called "instrumentation apertures" which are provided at the beginning in the cover 2a of the vessel of the reactor or in its bottom 2b. The device 20 according to the invention is sufficiently long for the active part to be in the immediate vicinity of the upper face or the lower face of the core 4 of the reactor. It will be understood that by such a fission product emission position, real failed fuel elements are simulated even better vis-a-vis the detection device 16.

FIG. 2 shows a first embodiment of the emission device 20, which comprises a cylindrical rod 24 which passes for example through the bottom 2b of the vessel through an instrumentation aperture 22'. Of course, one is not obliged to use the instrumentation holes and the rod may be oriented horizontally with respect to the axis of the vessel. This rod is fixed for example by a ring 26 and stud bolt-nut assemblies 28 on the bottom 2b. In addition, the rod 24 comprises a base 30 which is hermetically applied on the wall 2b via O-rings 32. In line with the rod 24, there is a chamber 34 limited by a cylindrical outer wall 36. This chamber 34 is divided into a first, so-called lower chamber 34a and an upper chamber 34b by a constriction 38 defining a narrow portion 40. Of course, the terms "upper" and "lower" are associated with the fact that the device is inserted in the bottom of the vessel of the reactor. Of course, these terms should be reversed in the case of the device (device 20b) passing through the cover of the reactor. The upper chamber 34b terminates in a conical nozzle 42 which opens out into the vessel of the reactor when the device is positioned. It will be understood that the restriction 38 and the nozzle 42 create pressure drops. The definition of these two elements is such that the pressure drop created by the constriction 38 is less than the one created by the nozzle 42 of the chamber 34b. In addition, the inner side wall of the upper chamber 34b is coated by a deposit or by a metal plate 44 of a radioactive product, therefore capable of emitting fission products. This product may for example be metal uranium or uranium oxide.

The rod 24 has tubes passing therethrough, which open out into the lower chamber 34a. There is firstly a tube 46 which opens out at the lower end of the chamber 34a and which is connected outside the rod 24 to two conduits 48 and 50 whose functions will be explained hereinafter. It is obvious that the tube 46 may very well be divided into two separate tubes. There is also a tube 52 which opens out in the upper part of the chamber 34a. Finally, a system 54 for monitoring the level of activity of the radioactive deposit 44 is located round the conduit 50.

the functioning of the device will now be described according to the different phases of operation.

Outside the periods of standardisation, no fluid is introduced into the tube 46. The fission products emitted by the radioactive deposit 44 in the chamber 34b pass through the constriction 38 and penetrate in the chamber 34a due to the difference in pressure drops between the nozzle 42 and the constriction 38. These fission products are evacuated in the lower chamber 34a via the tube 46 and conduit 50. There is therefore a flow of fission products to outside the vessel of the reactor. The flow of the fission products is obtained by the driving force due to the pressure of the fluid in the vessel of the reactor. It is obvious that the conduit 50 is directed with all the usual precautions towards a device for treating effluents and that the constriction is designed so that the rate of flow is very low. In this position, i.e. when the fission products are evacuated to outside the vessel, the monitoring system 54 makes it possible to monitor the physical and material state of the source constituted by the radioactive deposit 44. Due to this control, it is possible to disconnect the device without stopping the reactor, by obturating tubes 52, 50 and 48 if the state of the source is defective.

When it is desired to make a permanent emission of fission products in the vessel of the reactor and therefore in all the primary circuit, water is injected into the conduit 48, with the aid of a pump, at a pressure higher than 160 bars, i.e. at a pressure greater than that of the coolant fluid in the vessel of the reactor. This water passes through the chamber 34a, the constriction 38 as well as the chamber 34b, taking along the fission products. At the outlet of the nozzle 42, there is thus a permanent emission of fission products as long as the pressurised water is applied to the inlet of the conduit 48. Of course, the time for scavenging the chamber 34b is very much less than the average life of the fission products observed by the detection device. In addition, taking into account the path of the water in the chambers 34a and 34b and taking into account the material constituting the wall 36 of the chamber and its length, the water which leaves through the nozzle 42 is at a temperature substantially equal to that of the coolant liquid in the vessel of the reactor. Thermal shocks are thus avoided. It will be understood that it is interesting for a standardisation to produce square-wave emissions of fission products in the vessel of the reactor. To this end, the device according to the invention, in its improved embodiment, ensures a scavenging of the chamber 34a to remove all the fission products that it might contain. To this end, a small flow of water is injected through the conduit 48, this flow of water scavenges the chamber 34a, taking along the fission products. Evacuation is ensured via the tube 52 due to the pressure drop created by the constriction 38. Moreover, a certain flow coming from the vessel penetrates into the chamber 34b through the nozzle 42 then penetrates into the chamber 34a from which it is evacuated through tube 52. When this operation of scavenging has been effected, it suffices to carry out the operations corresponding to a permanent emission.

FIG. 3 shows a variant embodiment of the outlet nozzle 42. According to this embodiment, the nozzle 42' comprises a plurality of apertures 60. It also comprises a truncated part 62 forming the seat of a valve also constituted by a ball 64. It will be understood that when no pressure greater than the pressure in the vessel is applied by the conduit 48, the ball rests on its seat 62 and no fission product can penetrate in the vessel of the reactor. On the contrary, when pressurised water is applied in this tube, the ball rises and allows the emission of fission products (position shown in FIG. 3).

FIG. 4 shows a variant embodiment of the constriction 38. In this case, the constriction 38 defines a plurality of calibrated apertures 64 disposed in a ring and creating a pressure drop equivalent to that created by the constriction 38.

From the foregoing description, it will be understood that the device forming the subject matter of the invention has numerous advantages over the prior art. Apart from the advantages already indicated previously, it will be understood that this device allows a controlled emission of fission products. It is therefore possible to allow a greater instantaneous emission than in the previously existing systems. This makes it possible to obtain a greater detection signal at the device 16. In particular, the signal/background noise ratio for this device is improved. In addition, as the water leaving through nozzle 42 is at a temperature substantially equal to that of the water contained in the vessel of the reactor, not only the therml shocks are avoided, but also disturbances in the flow of the cooling fluid in the vessel. Finally, taking its structure into account, the device has small dimensions. For example, the outer diameter of the device and of its supporting rod 24 may be of the order of 15 mm. It is therefore easy to insert this device through the instrumentation holes 22' and 22 which are provided in the bottom and in the cover of the vessel of the reactor.

We claim:

1. In a standard fission product emission device, for detecting failed fuel elements in a nuclear reactor of the type cooled by pressurised water, said reactor comprising a pressure-resistant vessel and a core constituted by fuel element assemblies, a hollow rod is provided, adapted to be inserted into said vessel and defining a chamber divided into a first chamber and a second chamber located at the end of the rod by a constriction creating a first drop in pressure, said second chamber comprising on its wall a deposit or a metal plate of radioactive material and communicating with the vessel of the reactor, when said device is in position, by a nozzle creating a second drop in pressure greater than the one created by said constriction, first tube disposed in said rod and opening out at the end of the first chamber remote from the second chamber, said first tube being adapted to be connected to a source of pressurised water at a pressure greater than that of the cooling water of said reactor, and a second tube also opening out at the end of the first chamber remote from the second chamber and adapted to collect the fission products emitted by said deposit when no pressure is applied at the inlet of said tube.

2. The device of claim 1, wherein it comprises a third tube disposed in said rod and opening out at the end of said first chamber close to the second chamber, said third tube being adapted to collect the water injected at a low rate of flow into said first tube under the effect of the drop in pressure created by said constriction.

3. The device of claim 1, wherein said chamber is sufficiently long and has walls made of a sufficiently good heat-conducting material for the water injected into said chamber and leaving through said nozzle to be at a temperature substantially equal to that of the water in the vessel of the reactor.

* * * * *